United States Patent Office 3,526,511
Patented Sept. 1, 1970

3,526,511
PRODUCTION OF QUICK-COOKING CEREAL GRAINS
Louis B. Rockland, Pasadena, Calif., assignor to the United States of America as represented by the Secretary of Agriculture
No Drawing. Filed Nov. 16, 1967, Ser. No. 683,464
Int. Cl. A23l 1/10
U.S. Cl. 99—80    13 Claims

ABSTRACT OF THE DISCLOSURE

Wheat, rye, or other cereal grains are impregnated with an aqueous medium containing sodium chloride, sodium tripolyphosphate or the sodium salt of ethylenediamine tetraacetic acid, sodium carbonate, and sodium bicarbonate. The hydrated grains are then dried, for example, by contact with air at 140–160° F. Alternatively, the hydrated grains may be preserved by freezing, or by partial dehydration followed by holding at refrigeration temperatures.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of processes for preparing quick-cooking cereal grains. Further objects of the invention will be evident from the following description wherein parts and percentages are by weight unless otherwise specified.

The problems with which the invention is concerned are explained below, having particular reference to wheat. It is to be understood, however, that a similar situation is encountered with other cereal grains and in its broad compass the invention is applicable to cereal grains in general. For example, in addition to wheat, the invention may be applied to rye, oats, corn, barley, rice, milo, and the like.

It is recognized that there are serious food shortages in many parts of the world, particularly in India and the Far East. On the other hand, there is a surplus of wheat in the United States. An obvious plan of alleviation would involve exportation of this surplus grain to the areas where food shortages exist. However, the matter is not that simple. The food-deficient areas also have deficiencies in fuels. Consequently, wheat in its raw state is not satisfactory—it must be cooked for such a long time to bring it to an edible state that an inordinate amount of fuel must be consumed in preparing it for the table. In efforts to remedy this situation, various proposals have been made for precooking the wheat to reduce its cooking time. Generally, these precooking procedures involve such expedients as heating the wheat in boiling water or in stream under atmospheric or superatmospheric pressure. Various problems are encountered in these known techniques, including non-uniformity of treatment, i.e., some of the treated kernels will retain hard, uncooked centers. Also, the treatment may lead to rupturing or mushing of the individual grains.

In accordance with the invention, wheat or other cereal grains are made quick-cooking by a novel procedure not heretofore described or suggested and which obviates the problems outlined above.

In a practice of the invention the raw cereal grain is impregnated with a special hydration medium. Although this medium is largely water, it contains certain additives which provide advantageous results that cannot be obtained with water alone. These useful effects of the additives are exerted during the hydration (impregnation) step and subsequent thereto. Thus since the additives are present in the medium which penetrates throughout the grains when they are hydrated, the additives can exert their desired activity at this stage. Moreover, since the additives stay in the kernels even after the subsequent procedural steps, they remain distributed throughout the tissue where they can exert their influence in subsequent treatment of the products, for example, in storage, cooking, and consumption thereof.

A primary consideration is that the hydration medium contains one or more tenderizing agents. These agents contribute largely to the goal of attaining a product that is quick-cooking, i.e., one that can be prepared for the table by heating in water for a period of time which is one-half or less that required for cooking the untreated grain. Thus, during the hydration step these agents cause a tenderizing of the grain tissue, particularly of the bran layers. Such action is, of course, very desirable because the bran exhibits an especially tough and impervious nature. Moreover, when the products of the invention are cooked, the tenderizing agents distributed in the tissue cooperate with the applied heat and moisture to cause a further and rapid tenderizing, yet without such a violent action as to cause any substantial sloughing or other physical disruption of the individual grains. Such a desirable action is attained by having present in the hydration medium, primarily the following: Sodium chloride and a chelating agent. The sodium chloride has the principal effect of tenderizing the bran, and is also believed to assist in tenderizing proteinous and starchy components of the grains. Usually, the sodium chloride is present in the hydrating medium in a concentration of about from 1 to 3%. The chelating agent exerts a variety of useful effects, including the following: (1) It softens the pellicle or bran. (2) It aids in the solubilization of proteins and starchy components. (3) It acts as a buffer to maintain pH. (4) It facilitates uniform penetration of the hydrating medium into the centers of the grains, so that the final products have a uniformly smooth texture. (5) It tends to lighten the color of the product. With respect to the last item, the following will further explain this point: As hereinafter explained, an alkali metal carbonate, or bicarbonate, is a desirable constituent of the hydrating medium of the invention. However, these alkaline agents may cause color changes in the pigmented outer layers of the grains. These undesired color changes are prevented when a chelating agent is present with the alkaline material; in such case the grains retain their normal light color. Indeed, the hydration medium exerts the advantageous effect of extracting a great deal of highly-pigmented material from the outer layers (bran) of the grains, whereby a desirable lightening of the color of the grains is attained. In a practice of the invention, various conventional chelating agents may be used such as the alkali metal salts of ethylenediamine tetraacetic acid (hereinafter referred to as EDTA), alkali metal pyrophosphates or tripolyphosphates, citric acid or its alkali metal salts, etc. Generally, the chelating agent is added to the hydrating medium in a concentration of about from 0.1 to 5%. Particularly preferred is the conjoint use of sodium tripolyphosphate and tetrasodium EDTA—for example, 1% of the former; 0.5% of the latter—as providing especially good results coupled with a minimum amount of the chelating agents.

For best results, it is preferred that the hydrating medium be slightly alkaline, that is, have a pH of about 9. Depending on the chelating agent selected, this value may be attained directly, or it may be necessary to add an alkaline material, for example, sodium hydroxide, or more preferably, sodium carbonate or bicarbonate. The carbonate, or bicarbonate, not only acts as an alkaline agent and buffer but also acts as a protein dissociating, solubilizing or tenderizing agent. Particularly good results are attained with a mixture of sodium carbonate and sodium bicarbonate and the preferred form of the hydrating medium contains these components in concentrations of about 0.25% sodium carbonate and 0.75% sodium bicarbonate.

Optionally, the hydration medium may contain additional agents. For example, one may include a trace (about 0.01–0.05%) of a reducing agent such as sodium sulphide, cysteine, sodium mercaptoglycollate, or the like to assist in tenderizing the grains. An edible-grade surface active agent such as polyoxyethylene sorbitan palmitate or stearate may be added in minor concentration (about 0.05–0.5%) to assist penetration of the medium into the seeds. Antioxidants, for example, butylated hydroxy anisole, butylated hydroxy toluene, ascorbyl palmitate, etc. may be added to the hydration medium for their fat-stabilizing effect. Other additives which may be employed are antimicrobial agents such as sodium sorbate, sodium benzoate, or the lower alkyl esters of para-hydroxybenzoic acid. Although any such optional ingredients may be used, I have found that they are not critical and excellent products from the standpoints of color, flavor, stability, and ease of cooking are prepared wherein the hydration medium simply contains the basic ingredients: sodium chloride; a chelating agent such as an alkali metal salt of EDTA or sodium tripolyphosphate; and an alkaline agent such as a mixture of sodium carbonate and bicarbonate.

The impregnation of the cereal grains with the hydration medium may be carried out in various ways—for example, by soaking the grains in the hydration medium (holding the grains in contact with the medium at atmospheric pressure), by applying a vacuum application and release treatment as hereinafter described, or by combinations of both. In any event, the impregnation is continued until the moisture content of the grains is brought to a level of about from 40 to 65%. Also, to assist in attaining penetration of the hydration medium into the grains, they may be given a blanching treatment—e.g., holding them in boiling water for about ½ to 2 minutes—before they are contacted with the hydration medium. Such pre-treatment with boiling water is particularly desirable where the impregnation is conducted by soaking in that the pre-treatment markedly shortens the time required for hydration.

In a preferred modification of the invention, the impregnation is effected by a vacuum application and release technique. In utilizing this procedure, the grains are placed in a vessel together with an excess of the hydrating medium as hereinabove described using, for example, a weight of the hydrating medium about from 2.5 to 5 times the weight of the grains. The vessel is sealed and a vacuum is applied, then released. This cycle involving application of vacuum and release of vacuum is repeated as many times as necessary to achieve hydration of the grains. Depending on such factors as the type of grain, its hydration resistance, etc. anywhere from 1 to 20 cycles may be required.

My investigations have shown that such vacuum impregnation yields results much superior to those obtained by soaking—for example, hydration is attained in a shorter period of time. Thus, where the grains are simply soaked in the aqueous medium, the penetration of this liquid is strictly from the outer surface of the grains toward the inside. This type of penetration is very slow and, moreover, it encourages establishment of stresses and strains in the grains so that when they are subsequently cooked they may crack and split. In the procedure in question, however, the entry of the water follows an entirely different course. As a first step, the withdrawal of air from the bean tissues by the vacuum followed by release of the vacuum causes the liquid to rush into interior tissue structures, the liquid entering these structures through minute openings which extend to the surface of the grains. Thus as a first step the hydrating medium is actually placed within the structure of the grain. Once the liquid is thus inside it can diffuse readily into the various portions of the kernel. For example, it diffuses inwardly throughout the endosperm and outwardly through the various layers of bran. Also, the pumping effect caused by the alternate application and release of vacuum enhances the diffusion of the liquid throughout the grain tissue, i.e., it creates a dynamic situation in contrast to the static conditions which occur with mere soaking. The net result of the treatment is that the desired hydration or impregnation occurs not only rapidly but also uniformly throughout the structure of the individual grains.

The cycles of application and release of vacuum may be repeated until the grains are hydrated to the desired extent, i.e., until the moisture content of the grains is about 40–65%. Preferably, however, the treatment is completed by allowing the grains to stand (soak) in the aforesaid medium. Thus for example, the cycling may be repeated as many times as necessary to ensure essentially complete removal of interstitial air from the grains, and then allowing the grains to stand in the medium at atmospheric pressure to complete the hydration.

The impregnation (hydration) of the grains may be conducted at ambient (room) temperature or at temperatures above or below the ambient. Generally, elevated temperatures—for example, up to 100° C.—are preferred as expediting the hydration. However, certain limiting factors are to be considered. For example, in the vacuum cycling treatment the upper limit of temperature is about 55° C.; at higher temperatures the vapor pressure exerted by the hydration medium is so high that an effective vacuum cannot be attained. In conducting the vacuum cycling treatment, excellent results have been attained under conditions where the temperature is held constant at about 25° C., and under conditions where the system is initially heated to about 55° and then allowed to cool by the cooling effect of the evaporation which takes place. Excellent results have also been attained where the system is initially heated to about 55° C. and the cooling effect is partially offset by applying heating so that the final temperature is about 25–35° C. In the soaking operation elevated temperatures may likewise be employed to expedite tenderization of the grains. However, it is preferred to increase the temperature gradually, thus to avoid case-hardening or other non-uniform effects. Typically, where elevated temperatures are used, one may apply heat under such conditions that the temperature of the grains and surrounding hydration medium is increased at a rate of about 0.1 to 5 degrees C. per minute up to a maximum of 90–100° C.

After the grains are hydrated, they may be washed with water to remove the hydrating medium from the surface of the grains. This washing is conveniently carried out by placing the hydrated grains on a screen and spraying them with water. However, washing is an optional step and may be omitted.

Following washing, or directly after hydration, the grains are treated to put them in a condition whereby they may be shipped and stored without spoiling. Generally, dehydration is preferred as the most economical method of preservation. The dehydration can be accomplished with any of the conventional driers used with grain products. For example, a tray drier can be used where the grain spread on trays is exposed to a cross-flow or through-flow of air at about 140–160° F. Another example is the use of a column-type drier wherein the grain cascades over a baffle arrangement while exposed to a current of hot air. If desired, the drying may be conducted in stages, that is, a portion of the moisture content is removed in one stage, the material allowed to stand to permit equilibration of moisture and further drying and equilibration are repeated as necessary. Such step-wise drying is generally preferable as avoiding internal strains and thus preventing any rupture of individual kernels. In any event, the drying is continued until the product contains about 10% moisture.

Alternatively, the hydrated grains may be preserved by freezing. This is conveniently effected by placing the grains on trays and exposing them to refrigerated air. Generally, the air temperature and conditions of treatment (e.g., rate of air flow) are selected so that the freezing takes place rapidly. Generally, an air temperature of less than 0° F. is used and circulation of the air is rapid enough to get freezing in a short time, i.e., 5 minutes or less. The frozen product is then packaged in conventional manner and kept in frozen storage until used. For especially rapid freezing, the grains may be immersed in a cold liquid medium instead of being exposed to cold air. Especially useful in this connection is the technique of plunging the grains into liquid nitrogen whereby they become frozen almost instantaneously. The frozen product is then packaged and held in frozen storage as described. If desired, the treated grains may be packaged first and then frozen in conventional equipment such as a plate freezer.

In another alternative procedure, the hydrated grains are preserved by partial dehydration followed by holding at refrigerator temperatures. For example, the hydrated grains are dehydrated to a moisture content of 20–30%, then packaged—in transparent plastic bags, for instance—and held at temperatures of about 40° F. until they are ready to be consumed.

The invention is further demonstrated by the following illustrative examples:

EXAMPLE 1

Two solutions were prepared having the following compositions:

| Ingredient | Amount, percent | |
|---|---|---|
| | Solution I | Solution II |
| Sodium chloride | 2.5 | 2.5 |
| Sodium tripolyphosphate | 1.0 | 1.0 |
| Sodium bicarbonate | 0.75 | 0.75 |
| Sodium carbonate | 0.25 | 0.25 |
| Tetrasodium EDTA | 0.50 | None |
| Water | 95.00 | 95.50 |

The pH of the solutions was 9.0.

Lots of different cereal grains (in whole kernel form) were treated with the above solutions, using the following techniques in each case: The grain was placed in a vessel together with about three times its weight of solution. The vessel was closed and connected to a source of vacuum. The vacuum was maintained for about 5 min., then the vacuum was released. After 5 min. the vacuum was reapplied, held for 5 min., then released and so on. The number of cycles of vacuum application and release used in each instance is set forth below. In some instances, the solution was warmed at the start of the vacuum treatment. The information on temperatures is also provided below. Following the treatment by application and release of vacuum, the grain was allowed to stand in the hydrating solution for a period (given below). In some instances, the temperature of the solution was progressively increased during this standing period. Temperature data is provided below. Following residence in the hydrating solution, the products were dried in a current of air at about 130–140° F. until their moisture content was less than 10%. The products were then ready for packaging or use. It was observed that in all instances the kernels retained their structure intact with no noticeable cracking or splitting.

To test the cooking quality of the products, each lot thereof was added to boiling water and simmered until the products reached a standard tenderness, typical of properly cooked rice or wheat. This test was conducted on the products the day after they had been prepared and again after they had been stored for 6 months at ambient temperatures. For comparative purposes, samples of the original untreated grains were tested for cooking time. In all cases the products of the invention exhibited a much shorter cooking time and a better flavor than did the untreated grain.

The treatments applied and the results thereof are summarized in the following table:

| | Grain | | | |
|---|---|---|---|---|
| Solution | Wheat I | Rye I | Oats II | Barley II |
| Vacuum impregnation: | | | | |
| No. of cycles | 4 | 7 | 10 | 6 |
| Initial temp., °C | 55 | 55 | 30 | 25 |
| Final temp., °C | 35 | 35 | 10 | 25 |
| Soak: | | | | |
| Time, min | 360 | 120 | 15 | 720 |
| Initial temp., °C | 60 | 55 | 40 | 25 |
| Final temp., °C | 90 | 95 | 80 | 25 |
| Cooking time of products, min.: | | | | |
| Next day after preparation | 20 | 35 | 25 | 40 |
| After 6 months' storage | 25 | 35 | 25 | |
| Cooking time of untreated grain (control), min | 150 | 150 | 120 | 140 |

EXAMPLE 2

Lots of oats, wheat, and rye (in whole kernel form) were each treated as follows: The grains were held in boiling water for about one minute, then removed and soaked (24 hrs. for oats; 120 hrs. for wheat and rye) in an aqueous hydration medium maintained at room temperature and under atmospheric pressure. The hydration medium was that designated as solution II in Example 1, to which was added 0.05% of a 1/1 mixture of the methyl and propyl esters of para-hydroxybenzoic acid (to prevent fermentation during soaking). After the grains had been soaked they were removed and tested for cooking quality as described in Example 1. The results are summarized below:

Grain: Cooking time, min.
Oats _____ 50
Wheat _____ 70
Rye _____ 95

Having thus described the invention, what is claimed is:

1. A process for preparing quick-cooking cereal grains which comprises:
   impregnating cereal grains with an aqueous hydration medium containing sodium chloride in a concentration of about 1 to 3%, a chelating agent in a concentration of about 0.1 to 5%, and having a slightly alkaline pH,
   the impregnation being continued until the moisture content of the grains is brought to a level of about from 40 to 65%.

2. The process of claim 1 wherein the impregnation is by soaking the grains in the hydration medium.

3. The process of claim 1 wherein the impregnation is by applying successive application of vacuum and release of vacuum while the grains are in contact with the hydration medium.

4. The process of claim 1 wherein the impregnation is by a combination of soaking the grains in the hydration medium and successive application of vacuum and release of vacuum while the grains are in contact with the hydration medium.

5. The process of claim 1 wherein the grains are blanched in boiling water prior to impregnation.

6. The process of claim 1 wherein the impregnated grains are dehydrated to a moisture content of about 10%.

7. The process of claim 1 wherein the impregnated grains are frozen.

8. The process of claim 1 wherein the impregnated grains are dehydrated to a moisture content of about 20–30%, and held at refrigeration temperatures.

9. A process for preparing quick-cooking cereal grains which comprises:

subjecting cereal grains, while in contact with an aqueous hydration medium, to successive application of a vacuum and release of the vacuum, repeating the cycle of vacuum application and release until the grains are essentially free from air and are partially hydrated, holding the grains in contact with said medium at atmospheric pressure until the moisture content of the grains is about 40–65%.

and drying the resulting products to a moisture content of about 10%, the said aqueous hydration medium containing sodium chloride in a concentration of 1 to 3%, a chelating agent in a concentration of about 0.1 to 5%, and having a slightly alkaline pH.

10. The process of claim 9 wherein the aqueous hydration medium contains water and the following ingredients:

| | Percent |
|---|---|
| Sodium chloride | About 2.5 |
| Sodium tripolyphosphate | About 1.0 |
| Sodium bicarbonate | About 0.75 |
| Sodium carbonate | About 0.25 |
| Tetrasodium EDTA | About 0.5 |

11. The process of claim 9 wherein the aqueous hydration medium contains water and the following ingredients:

| | Percent |
|---|---|
| Sodium chloride | About 2.5 |
| Sodium tripolyphosphate | About 1.0 |
| Sodium bicarbonate | About 0.75 |
| Sodium carbonate | About 0.25 |

12. The process of claim 9 wherein the aqueous hydration medium is heated to about 50° C. prior to initiation of the successive application and release of vacuum.

13. The process of claim 9 wherein the holding of the grain in contact with the aqueous hydration medium is at a temperature progressively increased at the rate of about 0.1 to 5 degrees C. per minute up to a maximum of about 100° C.

References Cited

UNITED STATES PATENTS

| | | | |
|---|---|---|---|
| 2,720,460 | 10/1955 | Flynn et al. | 99—80 |
| 2,890,957 | 6/1959 | Seltzer et al. | 99—80 |
| 2,937,946 | 5/1960 | Ozai-Durrani | 99—80 |

RAYMOND N. JONES, Primary Examiner